United States Patent [19]

Moriyama et al.

[11] 4,450,808

[45] May 29, 1984

[54] IGNITION TIMING CONTROL DEVICE

[75] Inventors: Eiichi Moriyama; Nobuyuki Kobayashi, both of Toyota, Japan

[73] Assignee: Toyota Jidosha Kogyo Kabushiki Kaisha, Toyota, Japan

[21] Appl. No.: 371,422

[22] Filed: Apr. 23, 1982

[30] Foreign Application Priority Data

Apr. 27, 1981 [JP] Japan .................................. 56-63558

[51] Int. Cl.³ .............................................. F02P 5/04
[52] U.S. Cl. .................................... 123/417; 123/571
[58] Field of Search ................ 123/417, 416, 415, 571

[56] References Cited

U.S. PATENT DOCUMENTS

| 4,094,287 | 6/1978 | Nohira | 123/571 |
| 4,125,099 | 11/1978 | Nouthuka | 123/571 |
| 4,133,325 | 1/1979 | West | 123/416 |
| 4,258,683 | 3/1981 | Hattori et al. | 123/416 |
| 4,314,540 | 2/1982 | Ikeura | 123/417 |
| 4,318,385 | 3/1982 | Yamaguchi | 123/571 |
| 4,347,570 | 8/1982 | Akiyama et al. | 123/417 |

FOREIGN PATENT DOCUMENTS

54-125327 9/1979 Japan .................................. 123/417

Primary Examiner—Andrew M. Dolinar
Attorney, Agent, or Firm—Cushman, Darby & Cushman

[57] ABSTRACT

An ignition timing control device which optimizes ignition timing even at low atmospheric pressures. This ignition timing control device comprises a detecting means for detecting when an exhaust gas recirculation (EGR) device should be actuated or not. When the detecting means indicates the EGR device is not actuated, but the quantity of intake air and engine speed are within a range of values where the exhaust gas recirculating device would be actuated at low altitudes, such ignition time is made to be optimum by delaying the timing.

3 Claims, 11 Drawing Figures

IGNITION TIMING CONTROL DEVICE

BACKGROUND OF THE INVENTION

1. Field of the Invention

The present invention relates to an ignition timing control device suitable for an internal combustion engine in which the ignition timing is controlled by means of an electronic control device.

2. Prior Art

Figure 1:
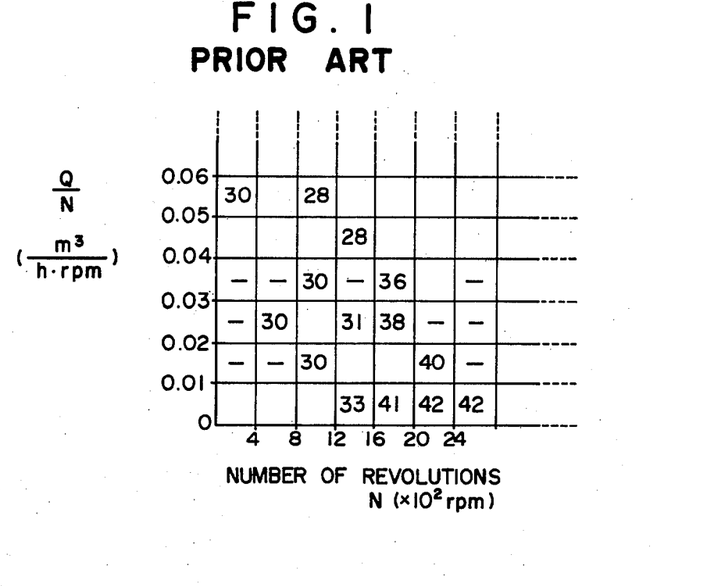
FIG. 1 is an explanatory view showing a calibration table of ignition timing.

Such an ignition time control device typically comprises a number of sensors. A crank angle detecting sensor detects the position and a number of revolutions of the crank shaft of an engine. A cooling water temperature sensor detects the temperature of cooling water for the engine. An air flow meter detects the quantity of intake air in the engine. Also, an electronic control device, involving a microcomputer, receives respective detection signals derived from the above respective sensors and the like and determines the optimum ignition timing based on these signals to optimize knock avoidance, engine power, fuel costs, purification of exhaust gas and the like. A distributor is controlled by an ignition timing control signal supplied from the electronic control device. In such ignition timing control devices, a calibration table of ignition timing, shown in FIG. 1, may be stored in a memory device or the like in the electronic control device. A correction value is taken out from the aforesaid calibration table on the basis of both the engine speed N (rpm) in the engine derived from the aforesaid crank angle detecting sensor as well as the quantity of intake air $Q(m^3/h)$ from the air flow meter. The optimum ignition timing is determined on the basis of this data, and the distributor is controlled by an ignition time signal derived from results of the above operations, whereby the ignition time of the engine is made to be optimum. As described above, when the optimum value of ignition timing is achieved, knocking does not occur, so that the power of the engine is elevated, fuel costs are reduced and purification of the exhaust gas becomes possible.

An exhaust gas recirculation (hereinafter referred to simply as "EGR") device has heretofore been utilized as a means for reducing nitrogen oxide (hereinafter referred to as "$NO_x$"). The EGR device recirculates a part of the exhaust gas to the intake system to include the exhaust gas in the intake mixture, thereby lowering the combustion maximum temperature at the time of combustion and to reduce production of $NO_x$. As a method for controlling EGR device, a load proportional system has recently been adopted for making the same in conformity with exhaust gas regulation. In such a controlling method, a negative pressure in the intake system is introduced to a chamber on the controlling side of an EGR valve through a vacuum solenoid valve (hereinafter referred to simply as "VSV"), and when a differential pressure between the negative pressure in the aforesaid chamber on the controlling side and atmospheric pressure becomes larger than a certain preset pressure $DP_E$, the EGR valve is opened to recirculate of the exhaust gas. Further, the aforesaid VSV is opened only when the cooling water temperature of the engine, the speed of the vehicle and the like reach a certain condition, so that the negative pressure in the intake system is introduced into the chamber on the controlling side of the EGR value. This means that when the above conditions have been achieved, the VSV is opened to supply the negative pressure in the intake system to the chamber on the controlling side of the EGR valve, and, when the differential pressure between the aforesaid negative pressure and atmospheric pressure exceeds the preset pressure $DP_E$, the EGR valve is opened. As a result, recirculation of exhaust gas is achieved. Conversely, when the temperature of cooling water is out of a prescribed range of water temperature, or when the negative pressure of the EGR port in the intake system is low as in a period during idling or full load of engine, or like conditions, the EGR device does not actuate. Thus, the VSV is operated to introduce atmospheric pressure into the chamber on the controlling side of the EGR valve, so that the negative pressure in the intake system is not supplied. As a consequence, the EGR valve is closed, and exhaust gas is not recirculated.

In the following, it will be described how the EGR device having the functions as mentioned above relates to the ignition timing system which has already been described.

When the EGR device is actuated, a part of the exhaust gas is included in the intake mixture as mentioned above, and accordingly the air fuel ratio is on the lean side, so that the required ignition timing of the engine must be usually set on the advanced side.

On the contrary, when the EGR device is not actuated, recirculation of the exhaust gas is not performed. Thus, the air fuel ratio is on the rich side, so that the required ignition timing of the engine must generally be set on at the delayed side.

Figure 2:
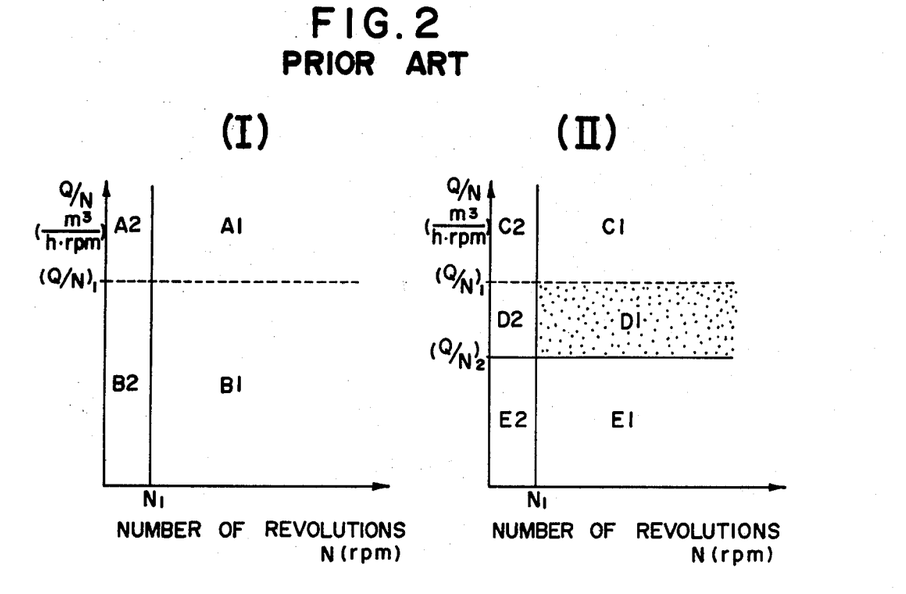
Figure 3:
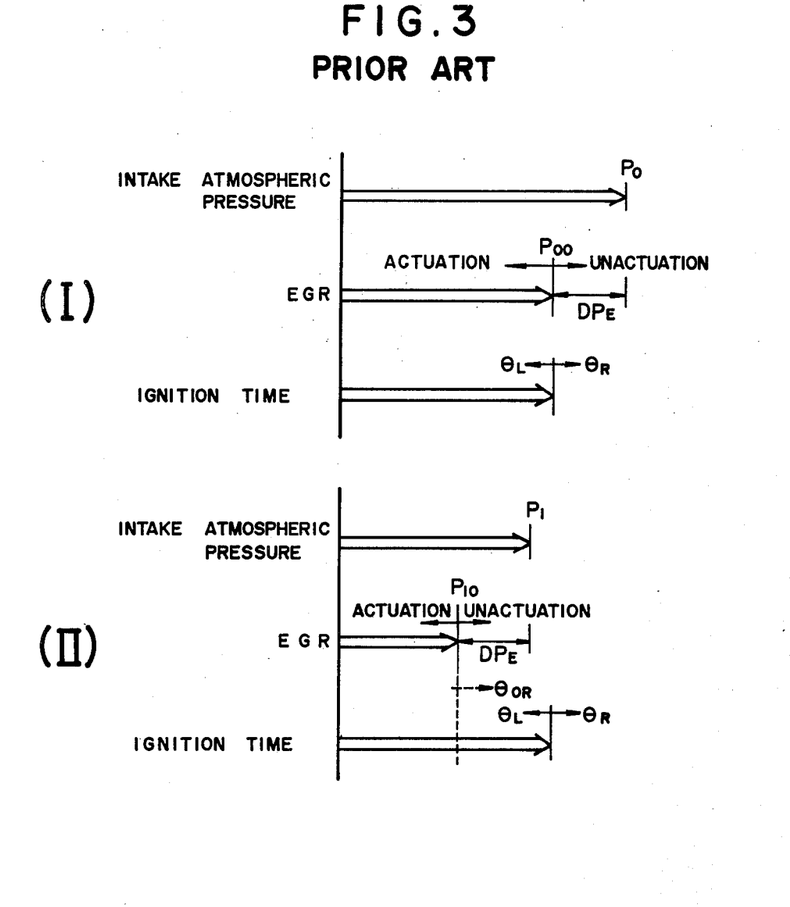

Furthermore, the relationship between the EGR device and ignition timing will be described in more detail hereinbelow by referring to FIGS. 2 and 3. FIGS. 2(I) and (II) are explanatory graphical representations each showing a simplified calibration table of the igniton timing in FIG. 1 wherein FIG. 2(I) indicates a state in which the calibration table is used at a low altitude, while FIG. 2(II) indicates a state in which the calibration table is used at a high altitude. In either of FIGS. 2(I) and (II), the engine speed N (rpm) is plotted as the abscissa and the ratio (Q/N) of quantity of intake air Q ($m^3/h$ to engine speed N is plotted as the ordinate. Further FIGS. 3(I) and (II) are explanatory views each showing a relationship between an EGR valve and ignition timing in respect of intake atmospheric pressure in which FIG. 3(I) indicates the relationship at a low altitude, and FIG. 3(II) indicates the relationship at a high altitude. As has been mentioned above, a correction at which the ratio (Q/N) of engine speed N (rpm) to quantity of intake air $Q(m^3/h)$ intersects with the engine speed N is read out in the calibration table shown in FIG. 1, and an optimum ignition time was determined on the basis of the correction thus read out. It is required, as was already described above, that such ignition time is fixed on the delayed side when the EGR valve is closed, while the ignition time is fixed on the advanced side when the EGR valve is opened. Thus, as shown in FIG. 2(I), changeover points $(Q/N)_1$ and $N_1$ are provided in the calibration table, defining regions $A_1$, $A_2$, and $B_2$ in which such correction makes the ignition timing be in on the delayed side, as well as a region $B_1$, in which such correction makes the ignition timing be on the advancing side. The aforesaid changeover points $(Q/N)_1$ and $N_1$ are the ones which were determined on the basis of the quantity of intake air Q and engine speed N when the engine is actuated under substantially 1 atmosphere (in other words, at low altitudes). More specifically, the aforesaid change-over points $(Q/N)_1$ and $N_1$ are determined on the basis of the quantity of intake air Q and engine speed N in a driving condition when the negative pressure associated with an open EGR valve is supplied and in addition the VSV is opened.

FIG. 3(I) is a view illustrating a condition in which a required ignition timing of the engine varies in accordance with opening and closing operations of the EGR valve and which indicates that the required ignition time $\theta$ of engine is on the delayed $\theta_R$ side when the EGR device is operated, while a required ignition time $\theta$ is on the advanced $\theta_L$ side when the EGR device is not operated. Accordingly, corrections for matching with the required ignition time as illustrated in FIG. 3(I) are set in the calibration tables shown in FIGS. 1 and 2(I).

The situation where an engine, controlled by means of the electronic controlling device provided with a calibration table for ignition timing as mentioned above, is driven at higher altitudes will be described hereinbelow. As illustrated in FIG. 3(II), the atmospheric pressure at higher altitudes is lower than at lower altitudes. If it is assumed that the intake atmospheric pressure at the higher altitude is $P_1$ and the engine is driven in this condition, it is necessary that the required ignition timing $\theta$ of the engine be set on the delayed side $\theta_{OR}$ when the temperature of the cooling water and the load cause the VSV is kept opened, and, in addition, when a negative pressure in the intake system exceeds a pressure $P_{10}$ for closing the EGR valve. Thus, the ignition timing is set on the delayed or advanced side based on whether the EGR valve is opened or closed. In this respect, however, such ignition timing is usually determined by the calibration tables shown in FIGS. 1 and 2 in conjunction with the actual engine speed N and quantity of intake air Q. In this case, there arises a problem when a value of angle of lead is determined on the basis of the correction in a region $D_1$, because the correction in the calibration table is stationary. That is, despite the fact that the required ignition timing is on the delayed $\theta_{OR}$ side, the ignition timing from the table for the region $D_1$ in FIG. 2(II), is on the advanced side, so that such ignition timing does not match with the required ignition timing. As a result, the ignition timing is too advanced so that knocking is observed in the engine, resulting in decreased power, so that reduced fuel costs cannot be attained.

SUMMARY OF THE INVENTION

It is an object of the present invention to provide an ignition timing control device which can prevent knocking in engines to increase the power of the engines even where there is low atmospheric pressure such as at high altitudes, to reduce fuel costs.

BRIEF DESCRIPTION OF THE DRAWINGS

FIG. 2(I) is an explanatory graphical representation illustrating a simplified state where the calibration table of ignition timing is used at low altitudes;

FIG. 2(II) is an explanatory graphical representation illustrating a simplified state where the calibration table of ignition timing is used at high altitudes;

FIG. 3(I) is an explanatory view illustrating a relationship between an EGR device and ignition time in respect of the intake atmospheric pressure at low altitudes;

FIG. 3(II) is an explanatory view illustrating a relationship between the EGR device and ignition time in respect of the intake atmospheric pressure at high altitudes;

FIG. 6(I) is an explanatory graphical representation illustrating a state where a calibration table of ignition timing according to the present invention is used at low altitudes;

FIG. 6(II) is an explanatory graphical representation illustrating a state where the calibration table of ignition timing according to the present invention is used at high altitudes;

FIG. 7(I) is an explanatory view illustrating a relationship between the EGR device and ignition timing in respect of the intake atmospheric pressure at low altitudes in the present invention; and FIG. 7(II) is an explanatory view illustrating a relationship between the EGR device and ignition timing in respect of the intake atmospheric pressure at high altitudes in the present invention.

DETAILED DESCRIPTION OF THE INVENTION

Figure 4:
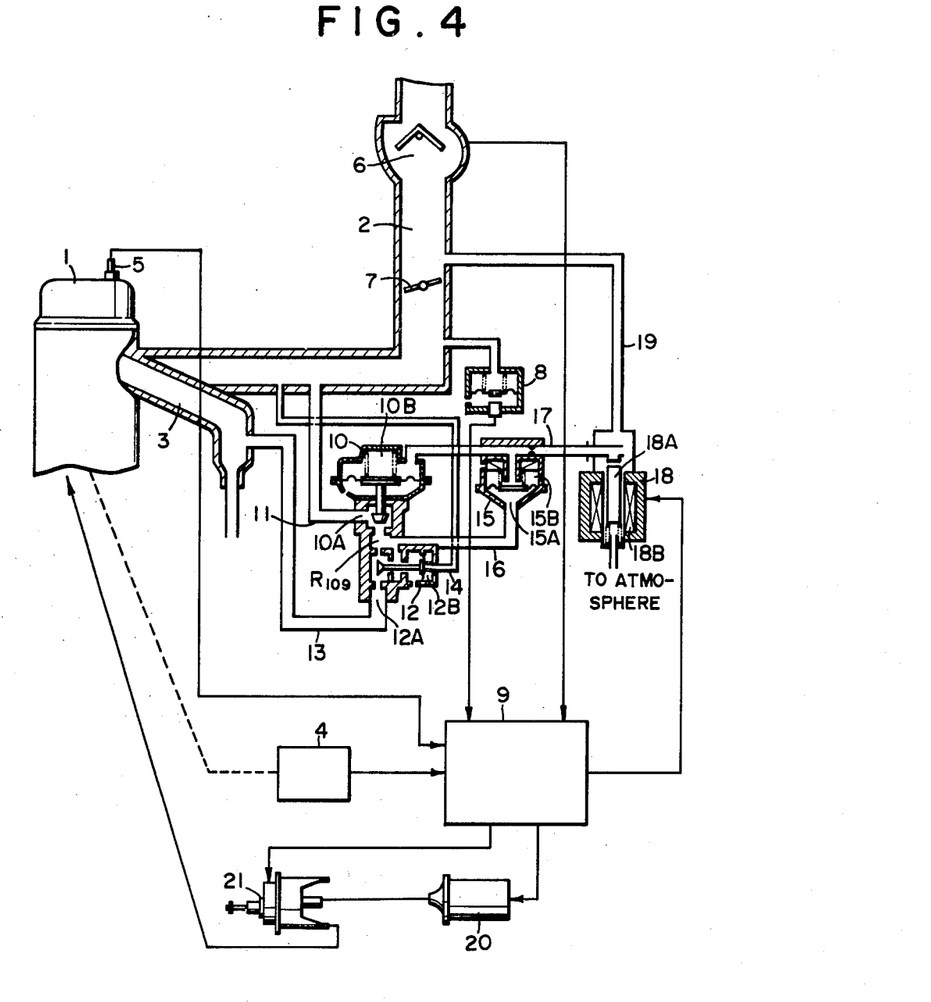
FIG. 4 is a constructional view showing an embodiment of the present invention.

FIG. 4 is a constructional view showing an embodiment of the present invention in which reference numeral 1 designates an engine taking in a mixture consisting of air and a fuel through an intake pipe 2 and exhausting the exhaust gas produced by subjecting the same to combustion through an exhaust pipe 3 tooutside of the engine.

Figure 7:
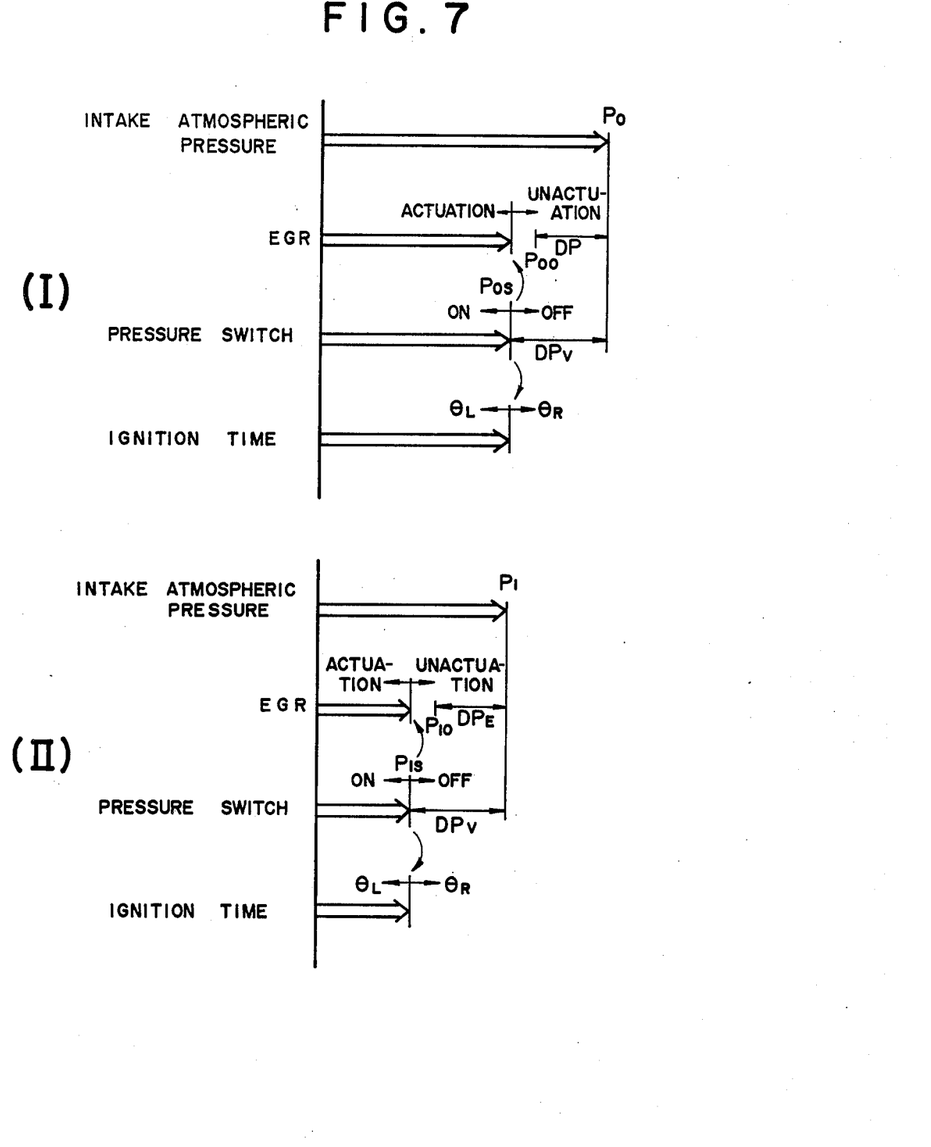

A crank-shaft (not shown) of the engine 1 is provided with a crank angle detecting sensor 4 for detecting the crank position and the number of revolutions thereof. The engine 1 is also provided with a cooling water temperature sensor 5 for detecting a temperature of the cooling water for the engine. Further the intake pipe 2 is provided with an air flow meter 6 which functions to detect a quantity of intake air $Q(m^3/h)$. A throttle valve 7 is disposed on the downstream of the air flow meter 6 in the aforesaid intake pipe 2. A pressure switch 8 is disposed on the further downstream of the throttle valve 7 in the intake pipe 2 as a detecting means for detecting whether an EGR valve being mentioned hereinbelow is in the actuation condition or not. The pressure switch 8 functions to detect a negative pressure in the intake pipe 2 and to convert the value detected into an electrical signal. In other words, the pressure switch 8 is arranged such that it can detect whether a differential pressure between the aforesaid negative pressure and atmospheric pressure exceeds or not a preset pressure $DP_V$ and generates an electrical signal related thereto. The preset pressure $DP_V$ of the pressure switch 8 is usually fixed at a value slightly higher than a preset pressure $DP_E$ of the EGR valve. The reason why there is a difference between both the preset pressures is such that there is hysteresis when the EGR valve changes state, besides there is also hysteresis when pressure switch 8 changes state. Thus, in order to always preset the ignition timing on the delayed side at negative pressure $P_{10}$ or less (pressure $P_1$ side) in which the EGR valve is closed as illustrated in FIG. 7(II), the aforesaid hysteresis is taken into consideration that the pressure switch 8 is turned off in good time, whereby the pressure switch 8 can be preset at an ignition timing on the delayed side. The pressure switch 8 is further connected with an electronic controlling device 9 so as to supply the pressure detecting signal obtained thereto. Since the pressure switch 8 is required to merely detect whether the EGR valve is actuated or not, the pressure switch 8 is only an example, and other manners of detecting the same thing may also be adopted. The electronic controlling device 9 functions to incorporate the respective signals obtained through the detections by means of the crank angle detecting sensor 4, the cooling water temperature sensor 5 and the air flow meter 6, respectively therein to effect prescribed processing based on these signals, thereby to perform controlling of ignition timing or the EGR valve. More specifically, the electronic controlling device 9 comprises a microcomputer with high controlling functions, an input unit for incorporating the respective signals detected from the aforesaid respective sensors into the aforesaid computer, an output unit for supplying a command on the basis of processed results fed from the aforesaid computer, a memory device for storing programs, various constants as well as corrections, and the like, an interface circuit for connecting the respective sensors or equipments of the engine 1 with the input and output units, and the other circuits such as a power source and the like.

The EGR device is a means for recirculating a part of the exhaust gas from the engine to the intake pipe 2 as described above, and has the following construction. A chamber 10A on the side of an opening part of a first EGR valve is connected to the intake pipe 2 through a piping 11 as shown in FIG. 4. The first EGR valve 10 is an integral part of a second EGR valve 12 and the inside of both valves communicate with each other as shown in FIG. 4. The second EGR valve 12 is connected to the exhaust pipe 3 through a piping 13 at an opening part 12A for introducing the exhaust gas. The second EGR valve 12 is controlled by a negative pressure introduced from the intake pipe 2 to a chamber 12B on the controlling side of the second EGR valve 12 through a piping 14 as shown in FIG. 4. A space $R_{109}$ formed between the first and second EGR valves 10 and 12 leads to a chamber 15A on the side of an opening part of an EGR modulator valve 15 through a piping 16. A chamber 15B on the controlling side of the EGR modulator valve 15 is connected with a chamber 10B on the controlling side of the aforesaid first EGR valve 10 through a piping 17, and at the same time both the chambers 15B and 10B are connected to a first opening part of a vacuum solenoid valve (VSV) 18. On one hand, a second opening part of the VSV 18 is connected to the upstream part of the throttle valve 7 in the intake pipe 2 through a piping 19 as shown in FIG. 4. Further a third opening part of the VSV 18 opens the atmosphere. A plunger 18A is provided in the VSV 18 in a movable manner by means of a solenoid 18B, and this solenoid 18B is arranged to be moved on the basis of an output signal from the electronic controlling device 9. As a result, the VSV 18 can function to control a situation in respect of which either negative pressure in the intake pipe 2, or atmospheric pressure should be introduced into the chamber 10B on the controlling side of the EGR valve 10 dependent on the aforesaid output signal. That is, the plunger 18A may be in the situation shown in FIG. 4 in the case where atmospheric pressure should be introduced to the EGR valve 10 whereas the plunger 18A may be shifted to the lower part in FIG. 4 and the third opening part of the VSV 18 is closed in the case where negative pressure in the intake pipe 2 should be introduced into the EGR valve 10. Further reference numeral 20 designates an igniter for the generation of an ignition voltage which is controlled by the aforesaid electronic controlling device 9 and 21 a distributor for distributing the ignition voltage from the igniter 20 to an ignition plug in each cylinder of the engine 1, and the igniter and distributor form an ignition output unit for supplying such ignition voltage to ignition plugs in the engine 1. The igniter and distributor are arranged to be controllable by an ignition timing signal from the electronic controlling device 9.

Functions of the embodiment according to the present invention constructed as described above will be described hereinbelow by referring to FIGS. 5 through 7, inclusive.

Figure 5:
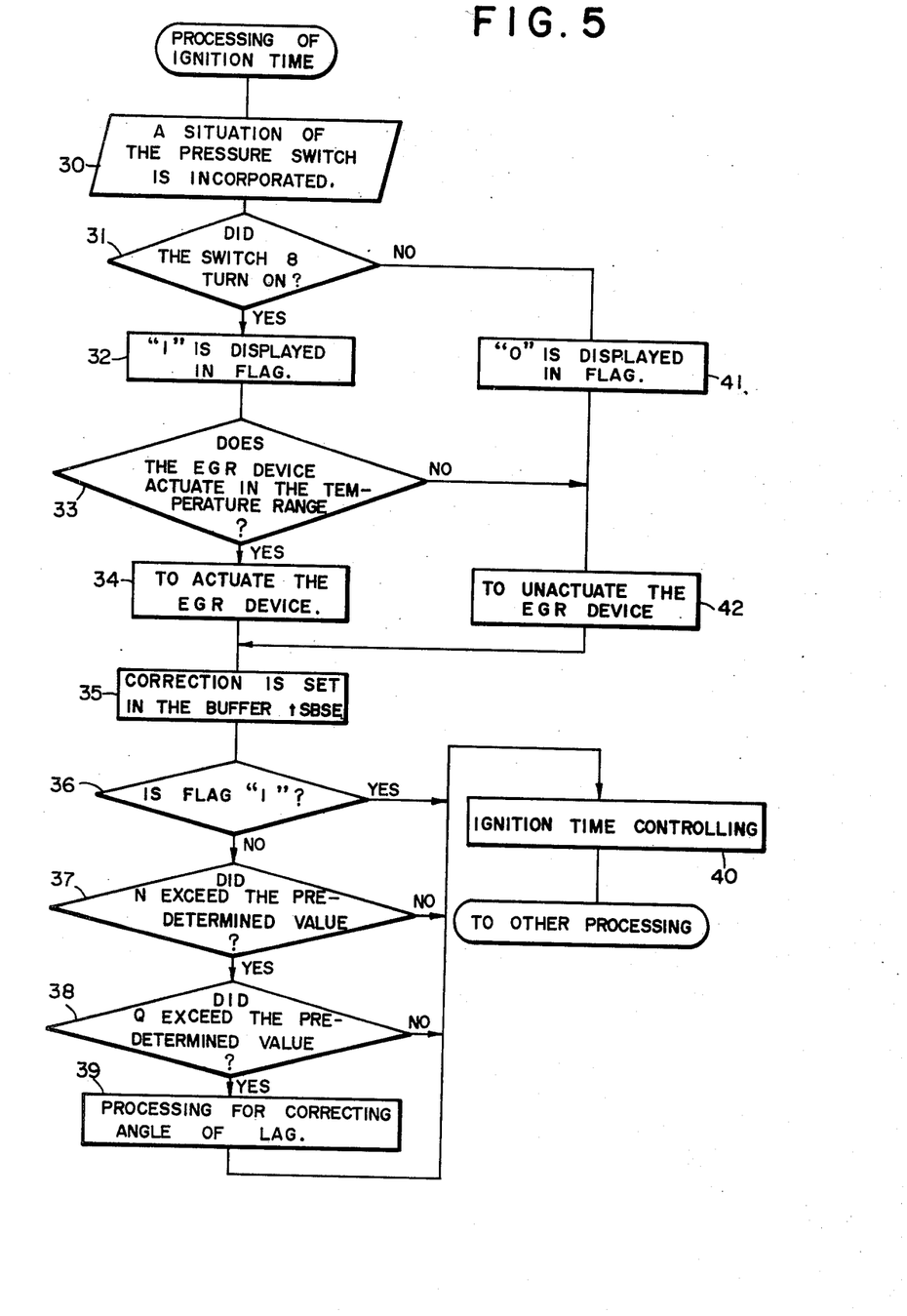
FIG. 5 is a flow chart illustrating an example of the operations in the embodiment according to the present invention.
Figure 6:
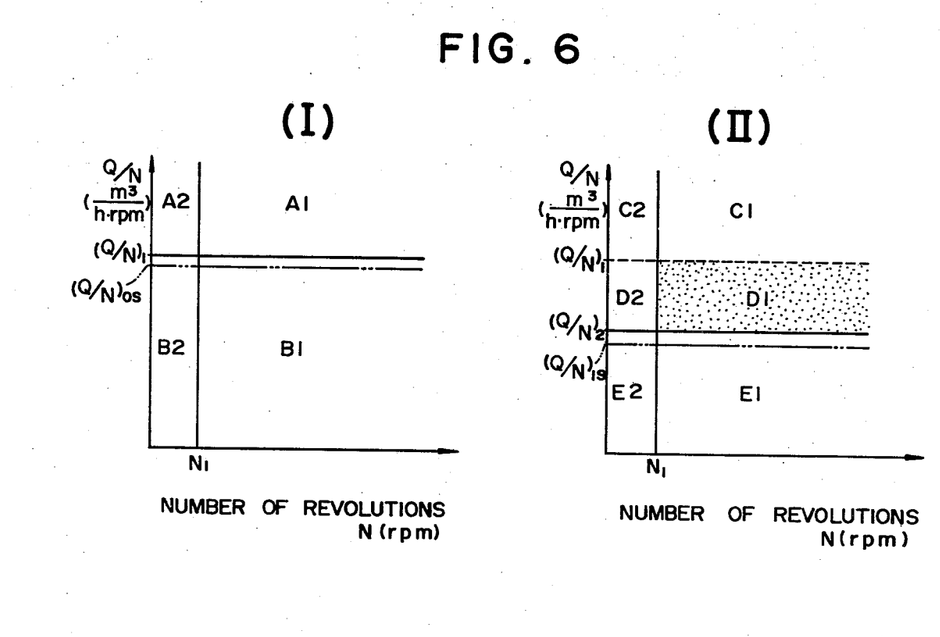

FIG. 5 is a flow chart illustrating an example of operations in the present embodiment. FIGS. 6(I) and (II) are graphical representations each illustrating the simplified calibration table of ignition time of FIG. 1 wherein FIG. 6(I) illustrates the calibration table at low altitudes, whilst FIG. 6(II) illustrates the calibration table at high altitudes. In either of FIGS. 6(I) and (II), engine speed N (rpm) is plotted as abscissa and a ratio (Q/N) of quantity of intake air Q(m$^3$/h) to engine speed N is plotted as ordinate. FIGS. (I) and (II) are explanatory views each illustrating an operating condition where the EGR device and ignition time are controlled by means of a pressure switch.

At first a case where the engine 1 is actuated at low altitudes will be described. In this case, as is understood from FIG. 7(I), a preset pressure DP$_V$ of the pressure switch 8 is fixed at a value slightly higher than a preset pressure DP$_E$ of the EGR valve 12. In this arrangement, when a negative pressure in the intake pipe 2 exceeds the preset pressure DP$_V$, in other words, when the negative pressure becomes lower than a pressure P$_{OS}$, such pressure is detected and the detection signal thereof is supplied to the electronic controlling device 9. Based on such pressure detection signal derived from the pressure switch 8, the electronic controlling device 9 opens the VSV 18 to supply a negative pressure to the first EGR valve 10 for the sake of operating the EGR device. As a consequence, the negative pressure detecting such fact that the pressure switch 8 exceeds the preset pressure DP$_V$ is a pressure released by the EGR valve 10, as a matter of course. Accordingly the EGR device operates to perform the exhaust gas recirculation through the following sequence: exhaust pipe 3→piping 13→second and first EGR valves 12 and 10→piping 11→intake pipe 2. In this case, a required ignition timing of the engine 1 is fixed on the advanced side. More specifically, in the case when the pressure switch 8 detects a negative pressure for causing the EGR valve 10 to open, the electronic controlling device 9 incorporates signals derived from the engine speed N and the quantity of intake air thereinto. Based on both the values, the electronic controlling device 9 controls ignition timing to either the advanced side or delayed side in the tables shown in FIGS. 6(I) and (II). In addition, a correction to optimize ignition timing is determined by the regions appeared on the tables, and ignition timing is controlled by such correction. In such case, the pressure P$_{OS}$ detected by means of the pressure switch 8 corresponds to (Q/N)$_{OS}$ in the table illustrated in FIG.

6(I), and this is substantially identical to a change-over point $(Q/N)_1$. For this reason, there is no problem even if the quantity of intake air Q in the case where it is higher than the pressure $P_{OS}$ of the pressure switch 8 (i.e., the EGR valve 10 opens) is decided to be equal to or less than the change-over point $(Q/N)_1$ at low altitudes. Consequently, the ignition time may be controlled by means of the correction in the calibration table illustrated in FIG. 6(I) without any modification.

The operations mentioned above will be described hereinbelow by referring to the flow chart illustrated in FIG. 5 wherein an input-output port of the computer in the electronic controlling device 9 is incorporated into a step 30, and a situation of the pressure switch 8 connected to this port is set in a register of the computer. In a step 31, the information of the pressure switch 8 incorporated is decided. Namely, when the pressure switch 8 exceeds the preset pressure $DP_V$, the operation shifts to a step 32, and on the contrary if the pressure switch 8 does not exceed such preset pressure, the operation shifts to a step 41. In the step 32, logic "1" is displayed in a flag of the computer in the electronic controlling device 9, and then the operation shifts to a step 33. In the step 33, it is decided whether a condition of cooling water temperature is within a range where the EGR device should be actuated or not, and as a result, if the condition is within such temperature range where the EGR device should be actuated, the operation shifts to a step 34, whilst when it is within a range where the EGR device should not be actuated, the operation shifts to a step 42. In the step 34, the VSV 18 is made to open through the output unit of the electronic controlling device 9, and negative pressure in the intake pipe 2 is supplied to the chamber 10B on the controlling side of the first EGR valve 10 to actuated the EGR device. Then, the operation shifts to a step 35 in which a correction is read out from the calibration table of ignition time shown in FIG. 6(I) based on a quantity of intake air Q and number of revolutions N, and the resulting correction is set in a buffer tSBSE. In a step 36, the aforesaid flag is detected, and in the case where the result detected is logic "1", the operation shifts to a step 40. In this step 40, an optimum ignition timing is determined by means of the electronic controlling device 9 on the basis of the correction set by the aforesaid buffer tSBSE, and the aforesaid igniter 20 and distributor 21 are controlled in accordance with the result determined to operate the engine 1 at the optimum ignition timing.

On the other hand, when it is decided that the pressure switch 8 corresponds to the pressure $DP_V$ where the EGR device should not be actuated in the step 31, the operation shifts to the step 41. In this step 41, logic "0" is displayed in a flag, and the operation is shifted to the step 42. In the step 42, the VSV 18 is actuated through the output unit in the electronic controlling device 9 to introduce atmospheric pressure into the chamber 10B on the controlling side of the first EGR valve. As a result, the EGR valve is closed so that the EGR device does not actuate. Then, the operation shifts to the step 35 in which a correction is determined by means of the calibration table illustrated in FIG. 6(I), the resulting correction is set in the buffer tSBSE, and the operation shift to the step 36. In the step 36, when the flag is detected to decide, logic "0" is decided, so that the operation shifts to a step 37. It is decided in the step 37 whether the engine speed N is in a range where the same exceeds a change-over point $N_1$ in the calibration table (the EGR device is actuated at low altitude) or not. If the engine speed N does not exceed the change-over point $N_1$, the operations shifts to the step 40, while if the engine speed N exceeds the point $N_1$, the operations shifts to a step 38. In the step 38, it is decided whether a quantity of intake air Q exceeds a change-over point $(Q/N)_1$ or not, and if it exceeds, the operation shifts to the step 40, but on the contrary if it does not exceed, the operation shifts to a step 39. At low altitudes, even if the operation shifts to the aforesaid steps 37 and 38, it is always decided that the operation should be shifted to the step 40. This is because, as described above, the change-over points $(Q/N)_1$ and $N_1$ substantially correspond to a quantity of intake air Q and a engine speed N in the case where they are in negative pressure actually operating the EGR device. Therefore ignition timing may be controlled by the correction in the calibration table as described above, and in this case a correct ignition time controlling can be made.

Next, a case when the engine 1 is operated in such a place where atmospheric pressure is low such as a highland will be described hereinbelow.

Initally, they VSV 18 is actuated to close the atmospheric pressure side (the third opening part) on the assumption that a condition for opening the EGR valve 10 is established in the case where it was detected that the pressure switch 8 exceeded the preset pressure $DP_V$ even at high altitudes, so that negative pressure in the intake pipe 2 is introduced into the chamber 10A on the controlling side of the EGR valve 10. As a consequence, the EGR valve is opened, and it results in recirculation of the exhaust gas into the intake pipe 2. In this case, if it contemplates to determine a quantity of intake air Q and engine speed N under a negative pressure $P_{IS}$ where the EGR device should be actuated from the calibration table shown in FIG. 6(II), a change-over point $(Q/N)_{IS}$ is obtained. In the region $E_1$ equal to or less than this change-over point $(Q/N)_{IS}$, such a correction for fixing the ignition time at the advancing side is orignally set in the region $B_1$ as illustrated in FIG. 6(I), so that there is not so remarkable problem.

On one hand, a problem arises in respect of ignition timing in the case when it was detected that the pressure switch 8 did not exceed the preset pressure $DP_V$ (i.e., the EGR valve 10 is closed). Namely, in the case when the EGR device is not actuated, it is necessary to fix a required ignition time of the engine 1 at the delaying side, whereas such a correction for fixing the ignition time at the advancing side is set in the region $D_1$ in the calibration table illustrated in FIG. 6(II). In this respect, it is required that such processing for converting the correction in the region $D_1$ to a correction by which ignition time is fixed at the delaying side so as to match the ignition time with a required ignition time of the engine 1 is carried out by the electronic controlling device 9. In brief, there is required to effect a processing for correcting angle of lag. In such processing for correcting angle of lag, for example, either a portion corresponding to the region $D_1$ of the calibration table shown in FIG. 6(II) is substituted for the second calibration table wherein such a correction by which the ignition time is fixed at the delaying side is set, or a processing of operation such that a certain value $\alpha$ is subtracted from the correction read out from the region $D_1$ is effected, and as a result a fresh correction is obtained. Thus, an appropriate ignition time is attained by means of such fresh correction. In short, it may be given by the following equation:

(Fresh correction) = (Correction) − α

The operations as mentioned above will be described in more detail hereinbelow by referring to the flow chart illustrated in FIG. 5.

At first, in the step 31, an explanation will be made on a case in which it was decided that the pressure switch 8 was in a pressure where the EGR device should not be actuated. In this case, however, the quite same processing flow as that in the case where it was detected that the pressure switch 8 exceeded the preset pressure $DP_V$ at low altitudes is performed, so that the explanation therefore will be omitted.

Next, an explanation will be made on a case where it was decided that the pressure switch 8 was in a pressure where the EGR device should not be actuated in the step 31.

In the step 31, when it is decided that the pressure switch 8 exceeded the preset pressure $DP_V$, the operation shifts to the step 41. In the step 41, logic "0" is displayed in a flag of the computer in the electronic controlling device 9, and then the operation shifts to the step 42. In the step 42, the VSV 18 is actuated through the output unit in the electronic controlling device 9 to introduce atmospheric pressure into the chamber 10B on the controlling side of the EGR valve, and the EGR valve 10 is closed to unactuate the EGR device. Thereafter, the operation shifts to the step 35 in which a correction is determined from the calibration table shown in FIG. 6(I), and the correction determined is set in the buffer tSBSE. In the step 36, since the flag displays logic "0", the operation shifts to the step 37. In this step 37, it is decided whether a number of revolutions N of the engine 1 is equal to or more than the change-over point $N_1$, (i.e., there is such a region where the EGR device should be actuated) or not. In highland, if the number of revolutions is equal to or more than the $N_1$, the operation shifts to the step 38. In the step 38, it is decided whether a ratio (Q/N) of quantity of intake air Q to engine speed N is in a region being equal to or less than the changeover point $(Q/N)_1$ (i.e., region $D_1$) or not. In this step 38, if such ratio is in the region $D_1$, the operation shifts to the step 39 wherein the above-mentioned processing for correcting angle of lag is carried out, and the operation shifts to the step 40. In the step 40, the igniter 20 and the distributor 21 are controlled by means of such correction to which angle of lag processing has been subjected, whereby the engine 1 can be operated at the optimum ignition timing.

The embodiment according to the present invention functions as described above.

To sum up, in the present invention, a pressure switch is provided which can detect a negative pressure at the time when the EGR valve changes state. That is, the pressure switch acts as a means for detecting whether the EGR device is actuated or not. The engine is arranged such that the ignition timing is corrected to the delayed side (corresponding to the above-mentioned correction of angle of lag) when it is decided that the EGR device should be in an unactuated condition by means and the of the above detection means quantity of intake air as well as engine speed are within the range where the EGR device should be actuated if the altitude were low. In brief, according to the present invention, the ignition timing of an engine is arranged to be controlled to the optimum ignition timing.

In accordance with the present invention, as mentioned above, when it is detected that the EGR device is not actuated, as determined by means of the detection means, and the quantity of intake air and engine speed are within the range in which the EGR device would be actuated at low altitudes, the ignition timing of the engine is corrected so as to be optimum. Accordingly the present invention has such advantages in that knocking can be prevented and at the same time, a high power of the engines can be maintained even at high altitudes, so that reduction of fuel costs in the engines can also be attained.

It should be apparent to those skilled in the art that the above-described embodiment represents but one of the many possible specific embodiments of the present invention. Numerous and varied other embodiments can be devised by those skilled in the art without departing from the spirit and scope of the present invention.

What is claimed is:

1. An ignition timing control device comprising:
   crank angle detecting means for detecting a rotational speed of an engine to emit an engine rotational speed detection signal;
   air flow metering means for detecting an intake air flow rate of said engine to emit an intake air flow rate detection signal;
   pressure switch means for detecting the presence of an intake pressure above a preset value when an exhaust gas recirculation device operates;
   igniter means for generating an ignition voltage and supplying said ignition voltage to said engine; and
   electronic control means for taking in said engine rotational speed detection signal from said crank angle detecting means and said intake air flow rate detection signal from said air flow metering means, generating a control signal for controlling ignition timing based on said detection signals and data on ignition timing previously stored in an ignition timing calibration table, correcting said control signal related to said ignition timing to a predetermined value of lag angle on the basis of said engine rotational speed detection signal and said intake air flow rate detection signal when both said pressure switch means indicates said preset pressure is not exceeded and the value of ignition timing obtained from said ignition timing calibration table is within a predetermined region where said exhaust gas recirculation device would be actuated at low altitude, and controlling said igniter means in response to said corrected control signal.

2. An ignition timing control device as claimed in claim 1, wherein said correcting function of said electronic control means subtracts a prescribed value from the value of ignition timing determined by said calibration table to correct such value on the side of said angle of lag.

3. An ignition timing control device as claimed in claim 1, wherein said correcting function of said electronic control means utilizes another calibration table of ignition timing in which the ignition timing is fixed on the side of angle of lag, and the ignition time on the side of angle of lag is determined from said another calibration table on the basis of engine speed and a quantity of intake air of said engine.

* * * * *